United States Patent [19]

Hughes

[11] 4,025,190
[45] May 24, 1977

[54] EXPOSURE CONTROL SYSTEM FOR PHOTOGRAPHIC COPYING

[76] Inventor: Marshall Hughes, P.O. Box 671, Lancaster, Calif. 93534

[22] Filed: Feb. 11, 1976

[21] Appl. No.: 657,021

[52] U.S. Cl. .................................. 355/68; 355/77; 356/226; 361/175

[51] Int. Cl.² ................ G03B 27/32; H01H 47/24; G01J 1/44; G03B 27/72

[58] Field of Search ................. 355/67, 68, 69, 70, 355/71, 77, 83; 354/24, 50, 51, 57, 60; 356/175, 218, 226; 317/124; 250/214 P

[56] References Cited

UNITED STATES PATENTS

| | | | |
|---|---|---|---|
| 2,354,544 | 7/1944 | Rath | 356/226 |
| 2,501,365 | 3/1950 | Varden | 355/68 |
| 3,533,705 | 10/1970 | Fukushima | 250/214 P |
| 3,790,789 | 2/1974 | Takahashi et al. | 355/68 X |
| 3,947,112 | 3/1976 | Reissig | 355/68 |

Primary Examiner—L. T. Hix
Assistant Examiner—William B. Perkey
Attorney, Agent, or Firm—Edwin A. Oser

[57] ABSTRACT

An exposure control for automatically controlling the duration of the exposure time for a photographic material to be printed. The light intensity is sensed by a sensor which could be either of the photoresistive or the photovoltaic type. A range control controls both the light sensor circuit and a timer control. The range control permits to return the indicator to a permanent mark despite variations of the lens aperture, negative density, degree of enlargement and the like, while simultaneously increasing or decreasing the length of a standard timing signal. The timing signal in turn controls the printer lamp to determine the exposure time.

19 Claims, 3 Drawing Figures

EXPOSURE CONTROL SYSTEM FOR PHOTOGRAPHIC COPYING

BACKGROUND OF THE INVENTION

This invention relates generally to an exposure control for printing photographic copies and particularly relates to such a control which permits to automatically adjust the exposure time in accordance with variations of certain parameters such as the lens aperture of the printer or the magnification ratio.

Many devices are presently known for determining the illumination level or light intensity which exists at the surface of a photographic material to be printed. By means of these devices the operator is able to adjust the light intensity, as well as the exposure time to provide a print which has been properly exposed without time consuming and expensive trial and error methods. Also, automatic exposure timers are generally known and widely used.

By means of a conventional light meter and timer it is possible to prepare excellent prints without trial and error. However, in general, the operator must have available two items of information. In the first place, he must know the light intensity at the plane of the projected image. Furthermore, he must know the sensitivity of the photographic material he has selected.

With this information available the operator must now correlate the sensitivity or "speed" of the photographic material with the readings of the light meter. This will then enable him to read the exposure time from the timer setting of the printer. Then the light meter is removed from the area of the image, replaced by the photographic material and the timed exposure cycle is started.

Some instruments do not read directly in terms of exposure time, but provide a multiplier which is to be used with the known exposure time. Therefore, the operator must calculate the new exposure time and enter it upon the setting of the timer of the printer.

If the operator selects a higher than normal magnification ratio, or a smaller lens aperture than the standard or normal one which may, for example, be done for purposes of distortion control, then the new exposure multiplier must be tediously recomputed before the print is made.

It is accordingly an object of the present invention to provide an exposure control apparatus which combines the functions of a conventional light meter with that of a conventional timer control, thereby to obviate the necessity of calculating exposure times.

A further object of the present invention is to provide an exposure control which is automatic and which operates both with black and white and color prints and which includes electronic controls.

Yet another object of the present invention is to provide an exposure control of the type where the operator must only enter a standard time corresponding to the speed of the selected photographic paper and can then adjust for variations of the lens opening, the magnification ratio and other parameters to automatically obtain the necessary timing signal.

SUMMARY OF THE INVENTION

In accordance with the present invention there is provided an exposure control apparatus for printing photographic copies. The apparatus comprises a light responsive sensor such as a photoresistive or a photovoltaic device. The purpose of the sensor is to sense the light intensity at the image plane, that is at the plane where a photographic material is to be exposed.

There is further provided an indicator for indicating the light intensity. A sensor circuit connects the sensor to the indicator thereby to provide an indication representative of the measured light intensity.

There is also provided a timing control for generating a timing signal corresponding to the desired exposure time. Finally, a range control is provided which is coupled both to the sensor circuit and to the timer control. The function of the range control is to change the indications of the indicator in accordance with variations of the lens aperture and similar parameters. At the same time the range control generates another signal which varies the duration of the timing signal so that the exposure time is automatically controlled in accordance not only with the sensitivity of the photographic material but also in accordance with the setting of the lens aperture, the magnification ratio and similar parameters.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
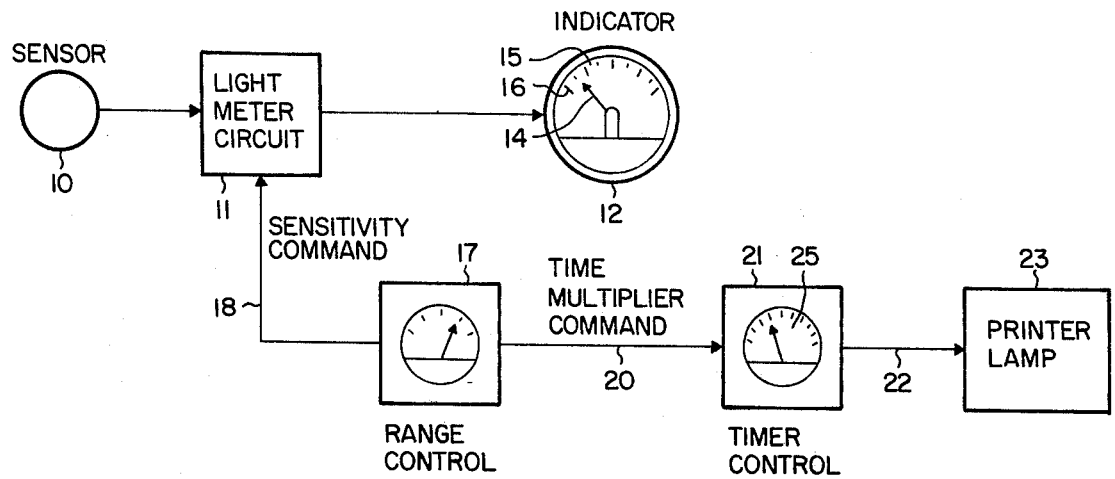
FIG. 1 is a simplified block diagram of the exposure control apparatus of the present invention.

Referring now to FIG. 1, there is illustrated schematically and in block form the exposure control apparatus of the present invention. The apparatus includes a sensor 10 for sensing the light intensity or illumination level provided by a printer lamp at the image plane, that is at the plane where the photographic material is to be exposed. As previously noted, the exposure control of the invention is equally applicable to black and white prints as well as to color prints. As will be subsequently explained, the sensor 10 may either be of the photoresistive or of the photovoltaic type. The sensor 10 is connected through a light meter circuit 11 to an indicator 12. The indicator 12 has a pointer 14 movable over a scale 15 on which may be provided a permanent mark 16.

There is further provided a range control 17 which generates a sensitivity command which is impressed by lead 18 upon the light meter circuit 11. At the same time, and automatically, a time multiplier command is applied by lead 20 to a timer control 21. The timer control issues a timing signal which is impressed by lead 22 upon a printer lamp 23. Therefore, and basically, the printer lamp is energized for a predetermined period of time to expose the printing material to light for the predetermined time period.

The instrument and the printing material are initially calibrated. This may, for example, be effected by a trial and error method to determine the necessary exposure time at a specific light level. This light level may be determined by the reading of the sensor 10 modified by the range control 17. This value may, for example, be expressed in seconds of exposure time. This exposure time will remain a constant and is always entered by the timer set control 25 whenever this particular printing material is to be used.

In order to prepare a desired print the operator may have to adjust the aperture of the lens of the printer and the magnification ratio. When this is done, the reading of the sensor 10 due to the light intensity provided by the printer lamp 23 will vary which in turn will move the pointer 14 of the indicator 12. The range control 17 will then have to be reset or adjusted to return the pointer 14 of the indicator 12 back to its previously set mark 16. All this is effected without the need for the operator to calculate the length of the adjusted timing signal or to do any other calculations. All he has to do is to adjust or operate the range control 17 until the pointer 14 returns to the fixed reference mark 16.

Figure 2:
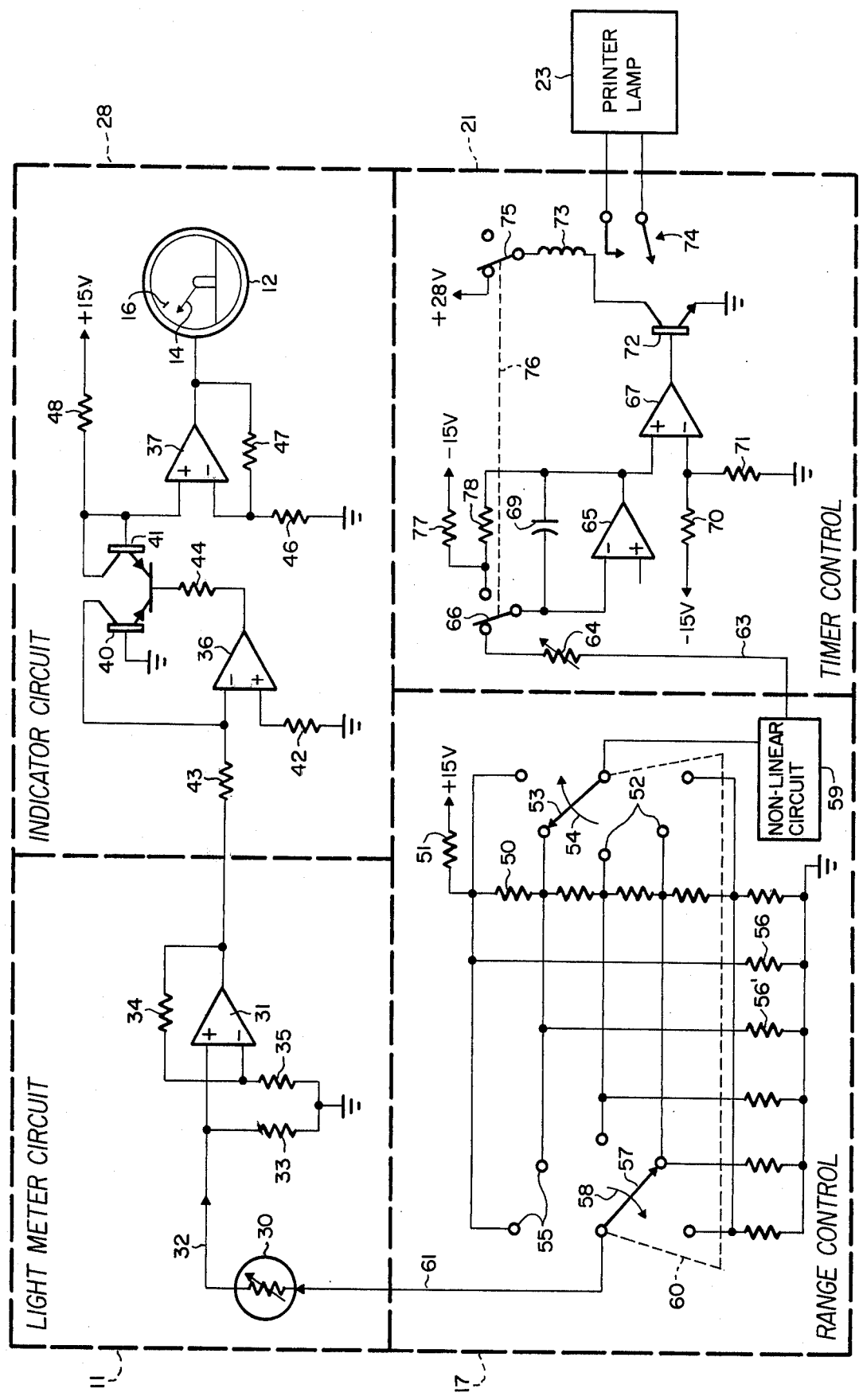
FIG. 2 is a circuit diagram of the electronic circuit in accordance with the present invention and including a photoresistive sensor, portions of the circuit being divided into blocks to correspond to the blocks of FIG. 1.

FIG. 2 illustrates a circuit diagram of the apparatus of FIG. 1. The circuit of FIG. 2 includes the light meter circuit 11, the indicator circuit 28, the range control 17, the timer control 21 and the printer lamp 23. The light meter circuit 11 may include, for example, a photoresistive cell 30 corresponding to the sensor 10 of FIG. 1. The indicator circuit 28 includes the indicator 12 with its pointer 14 and reference mark 16.

The photoconductive or photoresistive cell 30 may, for example, be a cadmium sulphide (CdS) photoconductive cell. The sensor 30 is followed by an operational amplifier 31 having a positive and a negative input terminal. The output of the photoconductive device 30 is applied by lead 32 to the positive input terminal and the signal is developed across a grounded input resistor 33. The feedback circuit includes a resistor 34 connected between the output and the negative input terminal which in turn is grounded through a resistor 35 to develop the feedback signal. Thus the feedback is determined by resistors 34 and 35 in series.

The indicator circuit 28 includes a pair of operational amplifiers 36 and 37 which form a logarithmic amplifier together with a pair of matched transistors 40 and 41. This logarithmic amplifier is conventional. The range of light values to be measured is expected to be large. Furthermore, the conventional method of expressing illumination ratios in photography is in logarithmic terms. This is the reason why it is preferred to use a logarithmic amplifier including amplifiers 36 and 37, and transistors 40, 41. This will provide a logarithmic transfer function between the output of amplifier 31 and the meter 12.

The positive input terminal of operational amplifier 36 is grounded through a resistor 42. The signal obtained from the light meter circuit 11 is impressed by a resistor 43 on the negative terminal of amplifier 36. The feedback path includes a resistor 44 connected between the output of amplifier 36 and the two emitters of transistors 40 and 41. Transistor 40 has its base grounded while its collector is returned to the negative input terminal of amplifier 36 to complete the feedback circuit.

Amplifier 37 has its negative input terminal grounded through a resistor 46 while the output is connected to the negative input terminal through a resistor 47. Hence resistors 46, 47 form the feedback path and determine the gain. The output signal of amplifier 36 is applied to the positive terminal of amplifier 37 through transistor 41. Transistor 41 has its base and collector interconnected to a positive voltage source through a resistor 48 which also provides the operating voltage for transistor 40.

The logarithmic amplifier including operational amplifiers 36 and 37 and matched transistors 40 and 41 operate in a conventional manner which may be explained as follows:

It is well known that bipolar transistors such as transistors 40 and 41 are predictable nonlinear elements. It can, therefore, be shown that the output voltage obtained from the output of operational amplifier 37 is proportional to the logarithm of the input voltage impressed upon resistor 43. This logarithm is multiplied by a constant which is proportional to absolute temperature as measured in degrees Kelvin.

Resistor 44 has the purpose to limit the loop gain of the input amplifier 36 so that it can be frequency compensated. In order to minimize the effect of the input bias current of the output amplifier 37, resistor 46 is so selected as to equal the diode impedance of transistor 41. The slope of the logarithmic characteristic is determined by the value of resistor 47. Finally, the value of resistor 48 determines the zero crossing point.

Thus basically the use of the circuit within block 28 as a logarithmic amplifier can be derived from the equations which can be set up on the basis of the emitter-base voltage differential between the two matched transistors 40 and 41 operating at different collector currents. It should be noted that transistor 40 is used as a feedback element around the operational amplifier 36. Because the feedback is negative, it forces the collector current of transistor 40 to be equal to the current into the summing input the negative input of the amplifier 36. On the other hand, the collector current of transistor 41 is determined by the positive voltage supply and by resistor 48.

The output voltage of amplifier 37 is now impressed on the indicator 12 causing its pointer 14 to move.

The use of a logarithmic amplifier is optional. In other words, the output of amplifier 31 may be directly impressed on the indicator 12. However, the logarithmic amplifier serves the purpose to more readily determine the illuminance range or scale of the negative to be printed. In other words, this serves as an aid to the operator's artistic judgment and helps him to select the contrast range of the printing material.

Turning now to the range control 17, there is provided a resistive network 50 consisting of a plurality of resistors connected in series between a positive voltage source, a resistor and ground. A series of contacts 52 are connected to the junction points of adjacent resistors of the network 50 and can be contacted by a switch 53 which rotates in a clockwise direction as shown by arrow 54. Another set of contacts 55 is provided and each contact is connected between a junction point of the resistive network 50 and ground through a resistor such as 56, 56' etc. The contacts 55 can be contacted by the switch 57 which rotates in a counter clockwise direction as shown by the arrow 58. The two switches 53 and 57 are mechanically interconnected as indicated at 60 in such a manner that they simultaneously rotate in opposite directions.

The switch 57 is connected by lead 61 to the photoconductive or photoresistive cell 30. Thus by operating the switch 57, 60 more or less of the resistance of the resistive network 50 may be connected serially between the positive voltage source and resistor 51 and the cell 30. Thus as the switch 57 is rotated in the direction of arrow 58 more and more resistance is added to that of the cell 30; or to put it in another way, less and less resistance or more and more voltage is applied by lead 63 to the timer control 21. It will be evident that all of this takes place automatically. It will also be evident that the range control 17 is a stepwise control in that the resistance is added in individual steps. By way of example, each step may represent a factor of 2 in sensitivity impressed by lead 61 upon the cell 30 and in the duration of the timing signal applied by lead 63 to the timer control. By way of example, turning the switch contacts 53 and 57 from the horizontal position in a clockwise direction for contact arm 57 will halve the voltage on the moving contact 57 and double the voltage on the moving contact 53. When the two contact arms 53 and 57 are both in a horizontal position equal voltages may be present at both of the moving contacts which may, for example, amount to 2.0 volts.

A conventional non-linear circuit or amplifier 59 may be connected to lead 63, that is between switch 53 and a variable resistor 64. The circuit 59 is optional and serves the purpose of compensating for the reciprocity failure of the photographic material. In other words, the density of the photographic material is not always proportional to the time integral of the exposure.

It should be noted that the output of operational amplifier 31 is a dc voltage proportional to the voltage drop across resistor 33. This voltage drop is determined by the current flowing from the moving contact arm 57 to ground through the photoconductive cell 30. Since the cell 30 is illuminated by the light, the intensity of which is to be measured, and since the resistance of resistor 33 is much smaller than that of the photoconductor cell 30, the output of the amplifier 31 is proportional to the control voltage on the moving contact 57 and the level of illumination falling on the cell 30.

If it should be desired to make small adjustments between the individual steps of the network of the range control, such adjustments may be made by the iris of the enlarger lens. Further the sensitivity may be varied by varying the bias voltage of the cell 30. This is usually done for calibration purposes only. The time multiplication as indicated before is varied by varying the input voltage to the timer and the two voltages are varied inversely with respect to each other.

The timer control 21 will now be discussed. The timer control includes an operational amplifier 65. The negative input is connected to lead 63 by the variable resistor 64 and a switch 66. The variable resistor 64 serves the purpose of adjusting the basic time scale of the timer. This may be done for the established sensitivity of the printing paper to be used. The output of amplifier 65 is connected to its negative input through a capacitor 69 which jointly with the resistor 64 forms a time constant circuit. The positive terminal of the amplifier 65 is not connected and the circuit operates like a Miller integrator.

The operational amplifier 67 operates in an open loop mode and serves as a threshold circuit and its negative input is connected to a negative voltage source through a voltage divider network 70, 71 connected between the voltage source and ground. The output of amplifier 67 is connected to the base of a transistor 72 having its emitter grounded. The collector is connected to the coil 73 of a relay to operate a pair of contacts 74 which are connected to the printer lamp 23. Thus when the coil 73 is energized by connecting it to a positive voltage source by contact 75 which occurs upon conduction of the transistor 72 the contacts 74 are closed for a predetermined period of time. This in turn will energize the printer lamp 23 for a time corresponding to the desired exposure. As long as the voltage at the positive input of amplifier 67 is more positive than the voltage at its negative input terminal determined by the negative voltage supply and the voltage divider consisting of resistors 70, 71, the coil 73 will be energized. This in turn will cause the printer lamp 23 to be energized to illuminate the photographic paper.

The exposure cycle is initiated by the operator pressing momentarily switch contacts 66, 75 toward the right as viewed in FIG. 2. The negative voltage supply applied through resistor 77 in conjunction with the feedback circuit around amplifier 65 including the resistor 78 drives the output of amplifier 65 to a positive value. This in turn establishes a charge across the timing capacitor 69. At the same time switch contact 75 opens the power supply to the relay 73. This in turn prevents the relay from energizing until the switch contacts 66, 75 are released by the operator to return into the position shown in FIG. 2. Hence when the switch contacts 66, 75 are released the coil 73 is energized to energize the printer lamp 23 by closing its contact 74 to start the exposure cycle. Simultaneously the output voltage of amplifier 65 goes in a negative direction. The rate of change of the output voltage of amplifier 65 is determined by the current permitted to flow through variable resistor 64 which is the exposure time control. Since the junction of capacitor 69 with the negative input terminal of amplifier 65 and the moving contact of switch arm 66 are at ground potential the exposure time will be proportional to the value of resistor 64 which has been adjusted. Furthermore, the exposure time is inversely proportional to the value of the dc voltage, that is the time multiplier command applied to the junction between lead 63 and variable resistor 64 by the moving contact arm 53. Movement of the contact arm 63 will result in different timing signal durations such as a multiple or submultiple of the standard timing signal.

As explained before, the timing signal is modified by the voltage applied by lead 63, variable resistor 64 and switch arm 66 to capacitor 69. This voltage is then modified by the voltage applied through resistors 77 and 78.

It will therefore be seen that all that is necessary is to adjust the range control in accordance with variations effected by the operator setting of say the lens aperture, the multiplication ratio and the like. This in turn will bring the pointer 14 back to its previously determined reference mark 16. Then the proper exposure time is automatically obtained and the printer lamp is automatically energized for the necessary exposure time.

It will be understood that the circuit specifications of the exposure control circuit of FIG. 2 of the invention may vary according to the design for any particular application. The following circuit specifications are included by way of example only:

--- operational amplifiers 31, 36, 37

| | |
|---|---|
| 65 and 67 | Type A741 |
| photoconductive device 30 | Clairex CL905HLL |
| transistors 40 and 41 | Type 2N2920 |
| resistor 33 | 3.3 K ohms |
| resistor 35 | 3.3 K |
| resistor 34 | 390 K |
| resistor 43 | 10 K |
| resistor 42 | 10 K |
| resistor 44 | 1 K |
| resistor 48 | 300 K |
| resistor 46 | 510 ohms |
| resistor 47 | 43 K |
| resistor 51 | 1 K |
| each of resistors 56, 56' etc. | 2 K |
| each of the resistors of resistive network 50 | 1 K |
| resistor 64 | 0-1 megohm |
| resistor 77 | 5.6 K |
| resistor 78 | 5.6 K |
| resistor 70 | 20 K |
| resistor 71 | 20 K |
| capacitor 69 | 5.0 microfarad |

Figure 3:
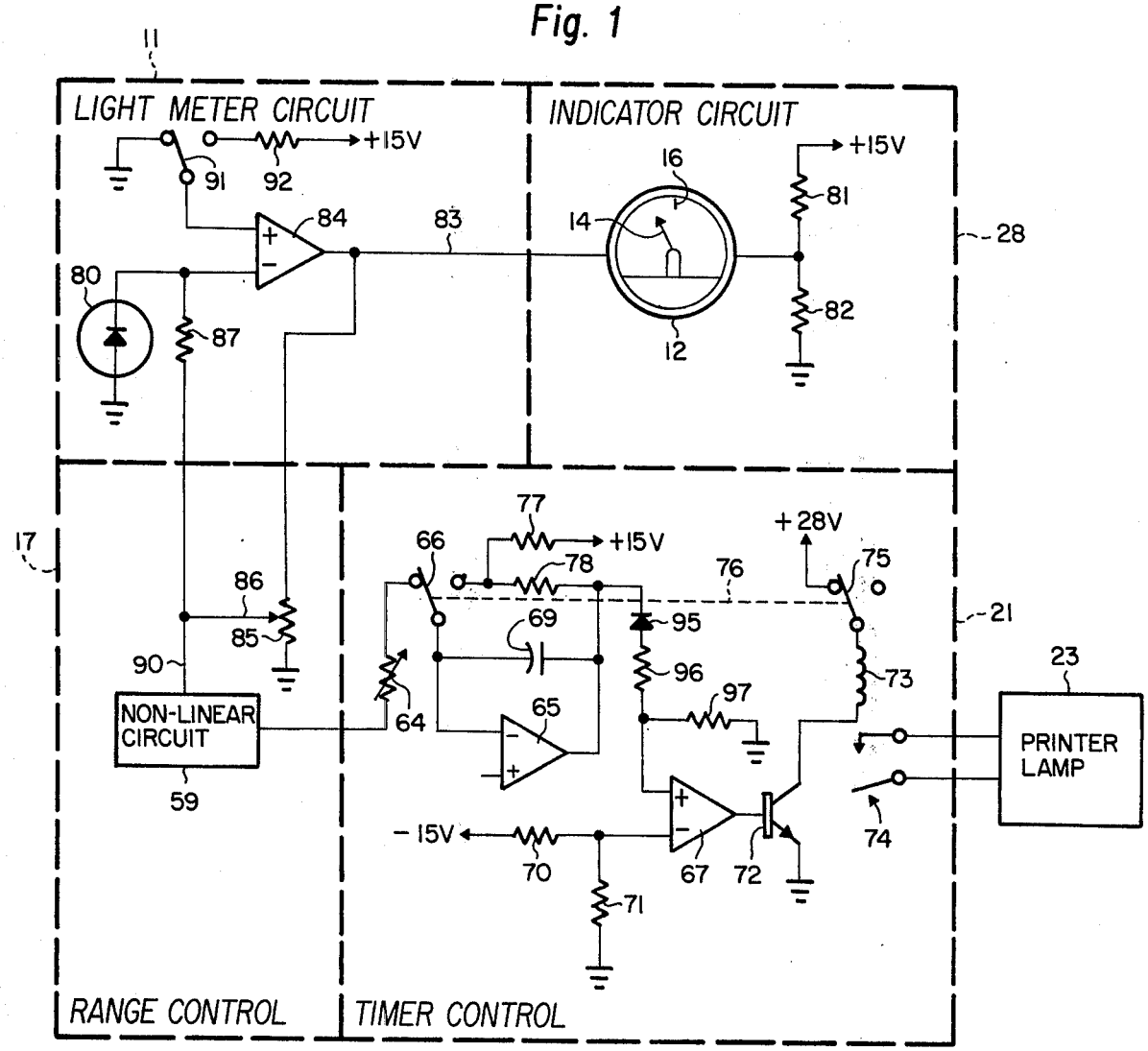
FIG. 3 is a circuit diagram of another embodiment of the invention utilizing a photovoltaic sensor and permitting a continuous variation of the range control.

Instead of utilizing a photoconductive or photoresistive cell it is also feasible to provide a photovoltaic light sensor. This is illustrated in the circuit of FIG. 3 to which reference is now made. The embodiment of FIG. 3 also provides continuous range control rather than the step-wise control of the circuit of FIG. 2. Here the light meter circuit 11 includes a photovoltaic cell 80 which makes it possible to simplify the electronic circuitry. The circuit of FIG. 3 again includes the indicator circuit 28, the range control circuit 17, and the timer control 21 connected to the printer lamp 23. The indicator circuit 22 again includes the indicator 12 with its pointer 14 and reference check mark 16. The indicator 12 is provided with a reference voltage from a positive voltage source through a voltage divider network 81, 82 connected between the voltage source and ground. Therefore, the indicator compares an input voltage obtained on input lead 83 to its reference voltage.

The light meter circuit 11 includes an operational amplifier 84. The output voltage of the photovoltaic cell 80 is impressed upon the negative input terminal. The feedback circuit between the output and the negative input terminal includes a portion of the resistance of resistor 85, the variable tap 86 and the fixed resistor 87. Hence by varying the tap 86 the gain of the operational amplifier 84 can be varied. At the same time the output voltage obtained from tap 86 is applied by lead 90 to the variable resistor 64 of the timer control 21. The timer control 21 is identical to that of FIG. 2 and the same parts have been designated by the same reference numerals. A non-linear circuit 59 may again be connected between the variable resistor 64 and the resistor 87. However, a change has been made in the timer control 21 of FIG. 3. Thus the output of amplifier 65 has been connected to the positive input of amplifier 67 through the diode 95 and a resistor 96 connected in series. The diode is so poled as to permit conduction when the output of amplifier 65 is more negative than the junction between resistor 96 and the positive input terminal of amplifier 67. A further resistor 97 is connected between the positive input of amplifier 67 and ground so that resistors 96 97 form a voltage divider network.

The circuit of FIG. 3 operates in the following manner. By moving the tap 86 say in a downward direction the resistance in the feedback circuit of the operational amplifier 84 is increased and thereby its gain is decreased.

At the same time the voltage impressed upon the variable resistor 64 is increased because there is less resistance in the circuit from the photovoltaic cell 80 through resistor 87, variable tap 86 and the bottom part of resistor 85.

In the exposure mode a switch 91 is moved from ground to a positive voltage source through a resistor 92 and this positive voltage is impressed upon the positive input terminal of amplifier 84. Accordingly, the amplifier 84 is driven to a fixed output voltage level. A fraction of the output voltage of amplifier 84 is applied as the input voltage to the integrator part of the timer control 21 which operates as previously described. Thus the range control reduces the speed of the integrator, that is the length of the timing signal by the same amount by which the feedback is reduced when the circuit operates in the meter mode, that is when the circuit operates to adjust the indicator 12. Therefore, basically the circuit of FIG. 3 accomplishes exactly the same object as does that of FIG. 2.

There has thus been disclosed an exposure control apparatus which automatically controls the timing signal for the printer of the system. It obviates the necessity for the operator to calculate the length of the exposure on the basis of a light meter reading. This results in a saving of the operator's time and in a reduction of operator errors. This in turn will eliminate the wasting of printing material and time. On the other hand, the control of the operator of the final print is enhanced. The system is flexible in that it is possible to vary the settings of the printer while simultaneously and automatically controlling the necessary variations in the exposure time.

What is claimed is:

1. An exposure control apparatus for printing photographic copies by means of a printer lamp comprising:
   a. a light responsive sensor for sensing the light intensity at the plane where a photographic material is to be exposed;
   b. an indicator;
   c. a sensor circuit connecting said sensor to said indicator for providing an indication representative of the measured light intensity;
   d. a range control coupled to said sensor circuit for changing the indications of said indicator in accordance with variations of the lens aperture and like parameters of the printer lamp; and
   e. a timer control for generating a timing signal corresponding to the desired exposure time for exposing the photographic material, said timer control being connected to and responsive to said range control, said range control upon adjustment generating a signal for returning said indicator to preset mark while simultaneously varying the timing signal generated by said timer control to automatically control the exposure time in accordance with both the sensitivity of the photographic material and the setting of the lens aperture.

2. An exposure control apparatus as defined in claim 1 wherein said light responsive sensor is a photoresistive device.

3. An exposure control apparatus as defined in claim 2 wherein said range control includes a voltage source and a resistive network, and means for serially adding resistance into the circuit including said range control and said photoresistive device while simultaneously increasing the voltage applied to said timer control, thereby to increase the duration of the timing signal.

4. An exposure control apparatus as defined in claim 3 wherein said sensor circuit includes a feedback amplifier serially connected between said photoresistive device and said indicator.

5. An exposure control apparatus as defined in claim 4 wherein a logarithmic amplifier is serially connected between said indicator and said feedback amplifier for determining the illuminance range exhibited by said indicator.

6. An exposure control apparatus as defined in claim 3 wherein said range control includes a set of resistors of predetermined value and switching means for stepwise including at will one or more of said resistors into the circuit.

7. An exposure control apparatus as defined in claim 3 wherein said range control includes a nonlinear circuit.

8. An exposure control apparatus as defined in claim 1 wherein a relay is coupled to said timer for controlling the printer lamp for exposing the photographic material.

9. An exposure control apparatus as defined in claim 1 wherein said sensor consists of a photovoltaic device.

10. An exposure control apparatus as defined in claim 9 wherein a feedback amplifier is connected between said photovoltaic device and said indicator.

11. An exposure control apparatus as defined in claim 10 wherein the feedback circuit of said feedback amplifier includes a variable impedance element, thereby to control the gain of said feedback amplifier and to provide said range control.

12. An exposure control apparatus as defined in claim 11 wherein a variable voltage is derived from said impedance element of said feedback circuit which is impressed on said timer control for increasing the exposure time when the voltage in said feedback circuit is decreased.

13. An exposure control apparatus as defined in claim 11 wherein a variable resistor is connected between said timer control and said range control for adjusting the time scale of said timer.

14. An exposure control apparatus for printing photographic copies by means of a printer lamp comprising:
   a. a light responsive photoresistive sensor for sensing the light intensity at the plane where a photographic material is to be exposed;
   b. an indicator;
   c. a feedback amplifier connected between said sensor and said indicator;
   d. a timer control for generating a timing signal corresponding to the desired exposure time for exposing the photographic material; and
   e. a range control consisting of a resistive network and a pair of switches, one of said switches being connected to said sensor while the other one of said switches is connected to said timer control, said switches and said network being so arranged that when the resistance serially connected with said sensor is decreased, the voltage applied to said timer control is simultaneously increased, the timing signal having a length dependent upon the voltage supplied thereto.

15. An exposure control apparatus as defined in claim 14 wherein a logarithmic amplifier is connected between said feedback amplifier and said indicator for exhibiting the illuminance range on said indicator.

16. An exposure control apparatus for printing photographic copies by means of a printer lamp comprising:
   a. a light responsive photovoltaic device for sensing the light intensity at the plane where a photographic material is to be exposed;
   b. an indicator;
   c. a feedback amplifier coupled between said device and said indicator and having a variable impedance element in its feedback circuit, thereby to control the gain thereof;
   d. a timer control connected to said feedback circuit in such a manner that the timing signal generated thereby is increased in duration as the feedback impedance of said feedback amplifier is increased; and
   e. said timer control including a variable, time-constant circuit for generating a timing signal corresponding to the desired exposure time for exposing the photographic material.

17. An exposure control apparatus as defined in claim 16 wherein a variable resistor is connected between said feedback circuit and said time constant circuit for setting the sensitivity of the time scale of said timer control.

18. An exposure control apparatus as defined in claim 16 wherein a non-linear circuit is coupled between said timer control and said feedback circuit.

19. The method of automatically controlling the exposure time required for printing photographic copies in accordance with the sensitivity of the selected photographic material, the aperture of the lens of the printer lamp, the selected magnification and like parameters by means of an indicator which comprises the steps of:
   a. sensing the light intensity at the plane where the photographic material is to be exposed;
   b. amplifying the received signal indicative of the light intensity and exhibiting it on the indicator;
   c. varying the amplitude of the signal indicative of the light intensity to return the indicator setting to a predetermined fixed setting;
   d. simultaneously and automatically varying the duration of a timing signal in accordance with the variations of the signal representative of the light intensity; and
   e. utilizing the timing signal to control the exposure time of the printer lamp.

* * * * *